United States Patent
Tsunehara

(10) Patent No.: US 7,914,085 B2
(45) Date of Patent: Mar. 29, 2011

(54) BRAKE CONTROL SYSTEM AND METHOD FOR AUTOMOTIVE VEHICLE

(75) Inventor: Hiroshi Tsunehara, Kanagawa (JP)

(73) Assignee: Nissan Motor Co., Ltd., Yokohama-shi (JP)

(*) Notice: Subject to any disclaimer, the term of this patent is extended or adjusted under 35 U.S.C. 154(b) by 1102 days.

(21) Appl. No.: 11/097,338

(22) Filed: Apr. 4, 2005

(65) Prior Publication Data

US 2005/0225170 A1 Oct. 13, 2005

(30) Foreign Application Priority Data

Apr. 8, 2004 (JP) .................................. 2004-114138

(51) Int. Cl.
*B60T 8/60* (2006.01)
*B60T 8/62* (2006.01)

(52) U.S. Cl. ........ 303/155; 303/189; 303/166; 303/167; 303/139; 303/9.62

(58) Field of Classification Search .................. 303/155, 303/189, 166, 167, 139, 9.62
See application file for complete search history.

(56) References Cited

U.S. PATENT DOCUMENTS

| | | | | |
|---|---|---|---|---|
| 3,773,364 A * | 11/1973 | Michellone et al. | ......... | 303/181 |
| 3,774,977 A * | 11/1973 | Fink et al. | ......... | 303/119.1 |
| 3,790,227 A * | 2/1974 | Dozier | ......... | 303/163 |
| 4,349,876 A * | 9/1982 | Lindemann | ......... | 701/73 |
| 4,835,693 A * | 5/1989 | Smith et al. | ......... | 701/70 |
| 4,852,950 A * | 8/1989 | Murakami | ......... | 303/192 |
| 5,332,298 A * | 7/1994 | Fujioka | ......... | 303/20 |
| 5,713,642 A * | 2/1998 | Okazaki | ......... | 303/121 |
| 6,030,056 A * | 2/2000 | Sawada et al. | ......... | 303/113.5 |
| 6,339,740 B1 * | 1/2002 | Seto et al. | ......... | 701/96 |
| 6,612,661 B2 * | 9/2003 | Udaka | ......... | 303/155 |
| 6,669,310 B2 * | 12/2003 | Obuchi | ......... | 303/155 |
| 6,672,433 B2 | 1/2004 | Yamaguchi et al. | | |
| 2002/0152015 A1 * | 10/2002 | Seto | ......... | 701/96 |
| 2005/0023886 A1 * | 2/2005 | Borroni-Bird et al. | ......... | 303/3 |

FOREIGN PATENT DOCUMENTS

| | | |
|---|---|---|
| JP | 07-001995 A | 1/1995 |
| JP | 07-081535 A | 3/1995 |
| JP | 09-048332 A | 2/1997 |
| JP | 2003-172385 A | 6/2003 |

* cited by examiner

*Primary Examiner* — Robert A Siconolfi
*Assistant Examiner* — Mahbubur Rashid
(74) *Attorney, Agent, or Firm* — Foley & Lardner LLP

(57) ABSTRACT

In brake control system and method for an automotive vehicle, a vehicle body deceleration increment correction quantity is set to zero during a start of braking, the vehicle body deceleration increment correction quantity is set to be gradually larger along with at least one of a decrease in the traveling velocity of the vehicle and an increase in a braking passage time in a first region in which a traveling velocity of the vehicle is equal to or higher than a first predetermined traveling velocity, and the vehicle body deceleration increment correction quantity is set to a substantially constant value in a second region in which the traveling velocity of the vehicle is lower than the first predetermined traveling velocity.

19 Claims, 5 Drawing Sheets

US 7,914,085 B2

BRAKE CONTROL SYSTEM AND METHOD FOR AUTOMOTIVE VEHICLE

BACKGROUND OF THE INVENTION

1. Field of the Invention

The present invention relates to a brake control system and method for an automotive vehicle, especially is suitable for the brake control system and method for the automotive vehicle which are capable of controlling a braking force for each of road wheels individually and separately from a brake operation state by a vehicle driver.

2. Description of the Related Art

A Japanese Patent Application First Publication No. 2003-172385 published on Jun. 20, 2003 (which corresponds to a U.S. Pat. No. 6,672,433 issued on Jan. 6, 2004) exemplifies a previously proposed brake control system in which a quality of a friction material of a brake unit is adjusted so that a braking force (=a frictional coefficient of the friction material) is increased along with an increase in a braking passage time, viz., a decrease of a vehicle traveling velocity up to a predetermined region and, thereafter, the braking force is made constant or made substantially constant. Thus, a compatibility between a sense of security on an movement of the braking force with respect to an operation at the first half of braking and a suppression of a self-oscillation and an easiness in a fine adjustment such as the adjustment of a stopped position of the vehicle at the latter half of braking is achieved.

SUMMARY OF THE INVENTION

However, since, in the brake system disclosed in the above-described Japanese Patent Application First Publication, an aging characteristic or a traveling speed characteristic of the braking force is adjusted only according to the quality of the friction material, a substantial braking force characteristic is varied according to a partial wear and a temperature of the friction material. It is, thus, difficult to stably obtain a desired characteristic.

It is, therefore, an object of the present invention to provide brake control system and method for an automotive vehicle which are capable of being stably compatible between the sense of security at the first half of braking and the suppression of the self-oscillation and easiness in the fine adjustment of the vehicular stopped position at the latter half of braking.

According to one aspect of the present invention, there is provided a brake control system for an automotive vehicle, comprising: a braking operation state detecting section that detects a braking operation state by a vehicle driver; a reference vehicle body deceleration setting section that sets a reference vehicle body deceleration in accordance with the braking operation state detected by the braking operation state detecting section; a vehicle body deceleration increment correction quantity setting section that sets a vehicle body deceleration increment correction quantity in accordance with at least one of a traveling velocity of the vehicle and a braking passage time; and a braking force controlling section that controls the braking force of each road wheel on the basis of an addition value of the reference vehicle body deceleration set by the reference vehicle body deceleration setting section and the vehicle body deceleration increment correction quantity set by the vehicle body deceleration increment correction quantity setting section, the vehicle body deceleration increment correction quantity setting section setting the vehicle body deceleration increment correction quantity to zero during a start of braking, setting the vehicle body deceleration increment correction quantity to be gradually larger along with at least one of a decrease in the traveling velocity of the vehicle and an increase in a braking passage time in a first region in which the traveling velocity of the vehicle is equal to or higher than a first predetermined traveling velocity, and setting the vehicle body deceleration increment correction quantity to a substantially constant value in a second region in which the traveling velocity of the vehicle is lower than the first predetermined traveling velocity.

According to another aspect of the present invention, there is provided a brake control method for an automotive vehicle, comprising: detecting a braking operation state by a vehicle driver; setting a reference vehicle body deceleration in accordance with the braking operation state detected at the braking operation state detecting; setting a vehicle body deceleration increment correction quantity in accordance with at least one of a traveling velocity of the vehicle and a braking passage time; and controlling the braking force of each road wheel on the basis of an addition value of the reference vehicle body deceleration set at the reference vehicle body deceleration setting and the vehicle body deceleration increment correction quantity set at the vehicle body deceleration increment correction quantity setting, at the vehicle body deceleration increment correction quantity setting, setting the vehicle body deceleration increment correction quantity to zero during a start of braking, setting the vehicle body deceleration increment correction quantity to be gradually larger along with at least one of a decrease in the traveling velocity of the vehicle and an increase in a braking passage time in a first region in which the traveling velocity of the vehicle is equal to or higher than a first predetermined traveling velocity, and setting the vehicle body deceleration increment correction quantity to a substantially constant value in a second region in which the traveling velocity of the vehicle is lower than the first predetermined traveling velocity.

This summary of the invention does not necessarily describe all necessary features so that the invention may also be a sub-combination of these described features.

DETAILED DESCRIPTION OF THE PREFERRED EMBODIMENTS

Reference will hereinafter be made to the drawings in order to facilitate a better understanding of the present invention.

Figure 1:
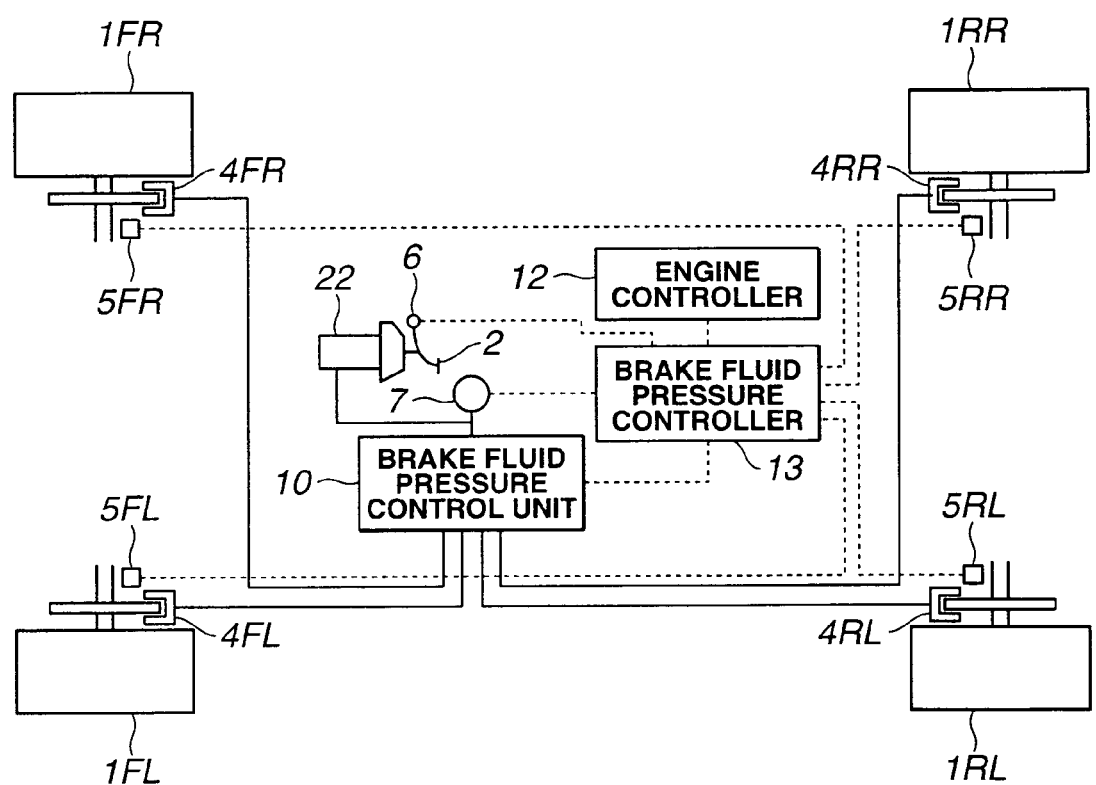
FIG. 1 is a rough system configuration view of an automotive vehicle to which a brake control system according to the present invention in a first preferred embodiment is applicable.

FIG. 1 shows a system configuration view of an automotive vehicle to which a first preferred embodiment of a brake control system according to the present invention is applicable. This vehicle is a front wheel drive vehicle in which front road wheels 1FL and 1FR are driving wheels and rear wheels 1RL and 1RR are driven wheels. An engine drive torque is transmitted to front road wheels 1FL, 1FR via a torque converter equipped automatic transmission. Each road wheel 1FL through 1RR is equipped with a wheel cylinder 4FL through 4RR constituting a, so-called, disc brake. Wheel cylinders 4FL through 4RR provide braking forces for respective road wheels 1FL through 1RR according to supplied braking fluid pressures. In this embodiment, wheel cylinders 4FL through 4RR are mechanically connected to a master cylinder 22 (via a distribution tube) which raises a braking fluid pressure along with an operation of a brake pedal (braking operator) 2 by a driver.

In addition, a braking fluid pressure control unit 10 is intervened between master cylinder 22 and wheel cylinders 4FL through 4RR of each road wheel 1FL through 1RR to adjust individually and separately the braking fluid pressures to respective wheel cylinders 4FL through 4RR. Specifically, braking fluid pressure control unit 10 increases the pressure of the braking fluid pressure as, for example, a driving force control system (TCS) and decreases the braking fluid pressure such as an anti-skid control system (ABS). Thus, the braking fluid pressure to wheel cylinders 4FL through 4RR of each road wheel 1FL through 1RR is adjusted individually and separately from the braking fluid pressure from master cylinder 22 and the braking force to each road wheel 1FL through 1RR can be controlled. Therefore, within braking fluid pressure control unit 10, a pump to suck or drain a working fluid and a pressure regulator valve or electromagnetic solenoid valve to control the braking fluid pressure itself are equipped. In this braking fluid pressure control unit 10, operation states of the pump and electromagnetic solenoid valve are controlled in accordance with a braking fluid pressure command value from a braking fluid pressure controller 13 so that the braking fluid pressures to wheel cylinders 4FL through 4RR for respective road wheels 1FL through 1RR are controlled.

In the vehicle shown in FIG. 1, revolution speeds (velocities) of respective road wheels 1FL through 1RR are detected by means of wheel velocity sensors 5FL through 5RR as road wheel velocities $Vw_i$, a brake pedal switch 6 which is turned to ON when brake pedal 2 is depressed, and a pressure sensor 7 to detect an output pressure of master cylinder 22 as a master cylinder pressure $P_{MC}$ are installed.

Braking fluid pressure controller 13 includes a calculation processing unit such as a microcomputer to perform various arithmetic operations. In addition, this braking fluid pressure controller 13 performs a mutual communication with an engine controller 12 which controls an engine driving state and inputs engine driving information such as an engine torque $T_E$ from engine controller 12. Then, braking fluid pressure controller 13 calculates a braking fluid pressure command value on the basis of road wheel velocities $Vw_i$ detected by road wheel velocity sensors 5FL through 5RR, a brake pedal switch signal BRK from brake pedal switch 6, master cylinder pressure $P_{MC}$ detected by pressure sensor 7, or the engine driving information such as an engine torque $T_E$ inputted from engine controller 12 and outputs this command value to braking fluid pressure control unit 10.

Next, a calculation processing of calculating the braking fluid pressure command value executed in braking fluid pressure controller 13 will be described with reference to a flowchart of FIG. 2. This calculation processing is executed by a timer interrupt for each of predetermined sampling times ΔT, for example, set to 10 milliseconds. It is noted that, although the flowchart shown in FIG. 2 does not install steps for the communications for another controller or control unit, the result obtained through the calculation processing is updated and stored in, for example, a random access memory and necessary information or program are read from the random access memory.

Figure 2:
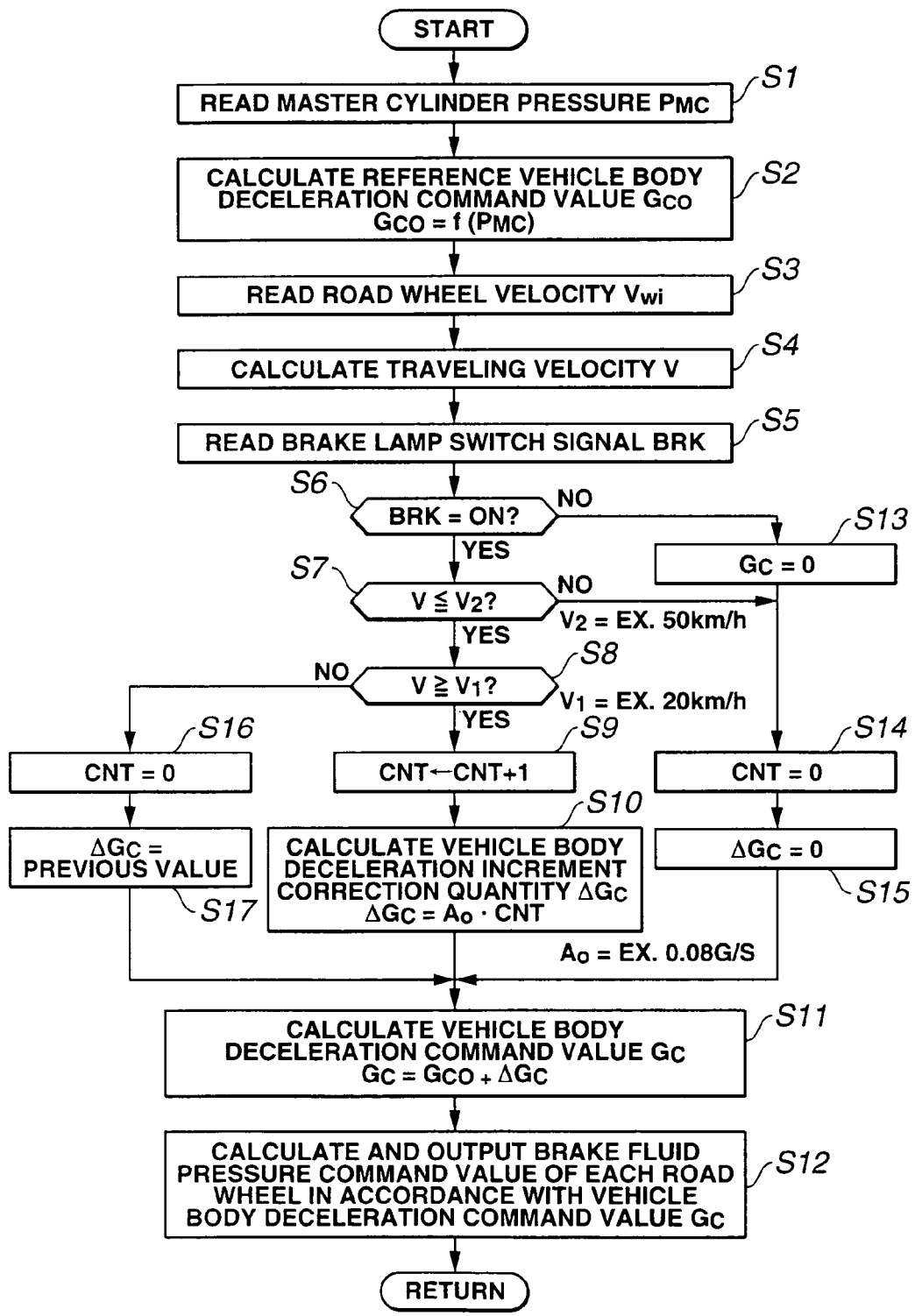
FIG. 2 is a flowchart representing a calculation processing of a calculation of a braking fluid pressure command value executed in a braking fluid pressure controller shown in FIG. 1.

As shown in FIG. 2, at a step S1, braking fluid pressure controller 13 reads master cylinder pressure $P_{MC}$ detected by pressure sensor 7. At the next step S2, braking fluid pressure controller 13 calculates a reference vehicle body deceleration command value Gco required for the vehicle body from, for example, a proportional function of master cylinder $P_{MC}$, viz., from a predetermined function f related to master cylinder pressure $P_{MC}$ read at step S1. At the next step S3, braking fluid pressure controller 13 reads road wheel velocities $Vw_i$ (i=FL through RR) detected by means of respective road wheel velocity sensors 5FL through 5RR. At the next step S4, braking fluid pressure controller 13 calculates the vehicular traveling velocity V from an average value of road wheel velocities $Vw_i$ read at step S3 or an average rear road wheel velocity of rear road wheels 1RL and 1RR which are driven wheels.

At the next step S5, braking fluid pressure controller 13 reads brake lamp switch signal BRK from brake lamp switch 6. At the next step S6, braking fluid pressure controller 13 determines whether brake lamp switch signal BRK read at step S5 is on state. If brake lamp switch signal BRK is on state (Yes) at step S6, the routine goes to a step S7. If No at step S6, the routine goes to a step S13.

At step S7, braking fluid pressure controller 13 determines whether traveling velocity V of the vehicle calculated at step S4 is equal to or lower than a second predetermined traveling velocity $V_2$ set, for example, from about 50 Km/h (an upper limit value of an ordinary traveling velocity in an urban area) to about 70 Km/h (an upper limit value of an ordinary traveling velocity at the suburbs). If traveling velocity V is equal to or lower than second predetermined traveling velocity $V_2$ (Yes), the routine goes to a step S8. If (No), the routine goes to a step S14.

At step S8, braking fluid pressure controller 13 determines whether traveling velocity V of the vehicle calculated at step S4 is equal to or lower than a first predetermined traveling speed $V_1$ set, for example, at about 20 Km/h (a velocity of the vehicle at which the vehicle driver starts to adjust the stopped position or a velocity of the vehicle immediately before a self-oscillation of a brake caliper and a brake rotor (hereinafter, referred to as a brake unit) is started). If traveling velocity V is equal to or higher than first predetermined traveling velocity $V_1$, the routine goes to a step S9. If not so (No) at step S8, the routine goes to a step S16. At step S9, braking fluid pressure controller 13 increments a timer counter CNT by one (CNT←CNT+1) and the routine goes to a step S10. It is noted that timer counter CNT accumulates an actual passage time at, for example, a unit of 10 milliseconds.

At step S10, braking fluid pressure controller 13 calculates a vehicle body deceleration increment correction quantity ΔGc by multiplying timer counter CNT incremented by step S9 with a predetermined increase rate Ao and the routine goes to a step S11. Predetermined increase rate Ao is to increase the deceleration developed on the vehicle body at a predetermined gradient. For example, predetermined increase rate Ao is a variation rate having a magnitude to a degree such that the vehicle driver feels that the deceleration is gradually increased, to a degree such that the vehicle driver hardly feels that the deceleration is increased or to a degree such that the vehicle driver does not feel the increase in a pitching quantity of the vehicle body. Specifically, predetermined increase rate Ao is set to, for example, 0.08 m/s²/sec. during the braking of approximately 2 m/s². This cannot give an unpleasant feeling to the driver.

On the other hand, at step S13, braking fluid pressure controller 13 clears vehicle body deceleration command value Gc to "0" and the routine goes to a step S14. At step S14, timer counter CNT is cleared to "0" and the routine goes to a step S15. At step S15, vehicle body deceleration increment correction quantity ΔGc is cleared to "0" and the routine goes to a step S11. At step S16, timer counter CNT is cleared to "0" and the routine goes to a step S17. At step S17, braking fluid pressure controller 13 sets vehicle body deceleration increment correction quantity ΔGc to a previous value and the routine goes to step S11. It is noted that in a case where traveling velocity V at the time of the braking start is lower than first predetermined traveling velocity $V_1$, the previous value of vehicle body deceleration increment correction quantity ΔGc is "0".

At step S11, braking fluid pressure controller 13 calculates a vehicle body deceleration command value Gc from an addition value between reference vehicle body deceleration command value Gco calculated at step S2 and vehicle body deceleration increment correction quantity ΔGc set at step S10 or step S15. At the next step S12, braking fluid pressure controller 13 calculates and outputs the braking fluid pressure command values for the respective road wheels in accordance with vehicle body deceleration command value Gc calculated at step S11 to braking fluid pressure control unit 10. Then, the routine is returned to a main program.

According to this calculation processing shown in FIG. 1, when traveling velocity V of the vehicle is higher than second predetermined traveling velocity $V_2$, vehicle body deceleration increment correction quantity ΔGc is "0". When traveling velocity V of the vehicle is between first predetermined traveling velocity $V_1$ and second predetermined traveling velocity $V_2$, vehicle body deceleration increment correction quantity ΔGc is gradually increased at predetermined increase rate Ao along with the increase of the braking passage time. When traveling velocity V of the vehicle is lower than first predetermined traveling velocity $V_1$, vehicle body deceleration increment correction quantity ΔGc is held, viz., set to a constant value.

In addition, vehicle body deceleration correction quantity ΔGc during a start of braking is "0". Hence, if the braking is started at a region in which traveling velocity V of the vehicle is higher than second predetermined traveling $V_2$, vehicle body deceleration increment correction quantity ΔGc remains at "0" until traveling velocity V of the vehicle is reached to second predetermined traveling velocity $V_2$. In addition, even if the braking is started at the region in which traveling velocity V of the vehicle is lower than first predetermined traveling velocity $V_1$, vehicle body deceleration increment correction quantity ΔGc remains at "0". On the other hand, if the braking is started at traveling velocity V between first predetermined traveling velocity $V_1$ and second predetermined traveling velocity $V_2$, vehicle body deceleration increment correction quantity ΔGc is gradually increased at predetermined increment rate Ao until traveling velocity V of the vehicle becomes first predetermined traveling velocity $V_1$. From a time at which traveling velocity V of the vehicle becomes first predetermined traveling velocity $V_1$, vehicle body deceleration increment correction quantity ΔGc when traveling velocity V of the vehicle becomes first predetermined traveling velocity $V_1$ is held at a substantially constant value.

Figure 3A:
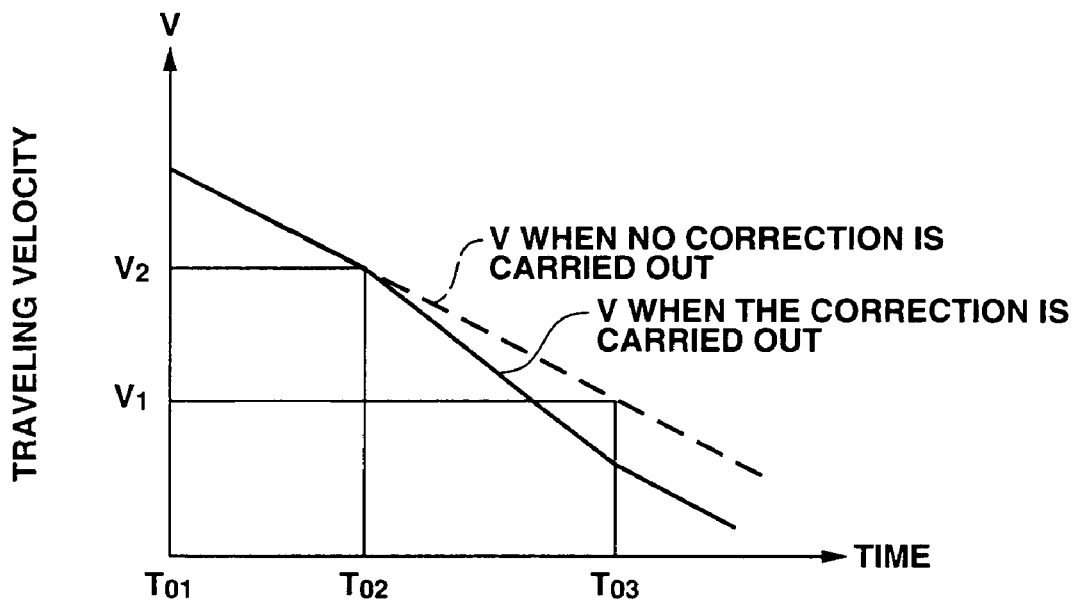
FIGS. 3A and 3B are integrally a timing chart for explaining an action achieved by the calculation processing shown in FIG. 2.
Figure 3B:
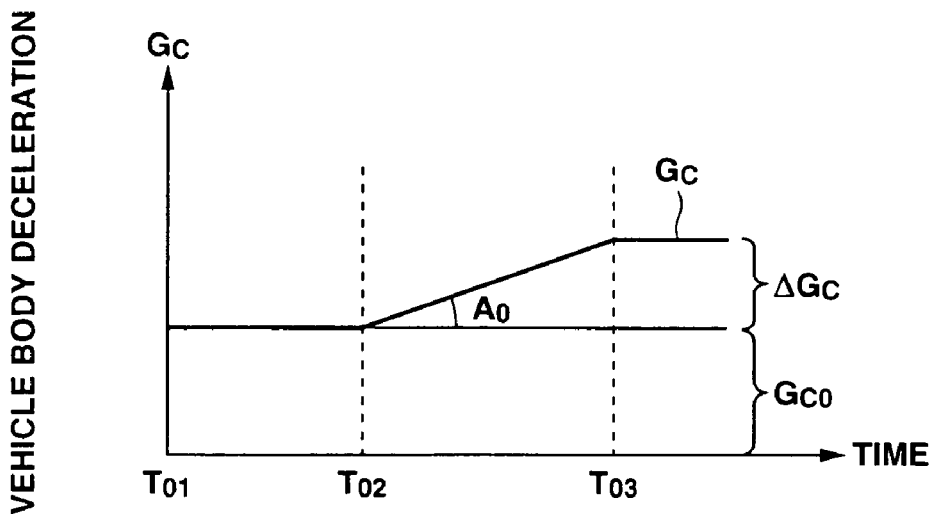

FIGS. 3A and 3B integrally show an aging variation of vehicle body deceleration increment correction quantity ΔGc when assuming that the braking is started at a time $T_{01}$ when traveling velocity V of the vehicle is present within a region higher than second predetermined traveling velocity $V_2$ and traveling velocity V of the vehicle is decelerated at an approximately constant gradient. It is noted that, for facilitating the explanation, reference vehicle body deceleration command value $G_{CO}$ in accordance with master cylinder $P_{MC}$ is held at the constant value or at an approximately constant value.

In this simulation, vehicle body deceleration increment correction quantity ΔGc is held at "0" while the time has reached from time point $T_{01}$ to a time point $T_{02}$ at which traveling velocity V of the vehicle becomes second predetermined traveling velocity $V_2$. In a, so-called, high speed traveling state in which traveling velocity V of the vehicle is equal to or higher than second predetermined velocity $V_2$, the vehicle driver, generally, does not expect the large deceleration and rather carries out the braking such that traveling velocity V is fine adjusted. The maintenance of vehicle body deceleration increment correction quantity ΔGc to "0" facilitates fine adjustment of traveling velocity V.

From time point $T_{02}$ at which traveling velocity V of the vehicle becomes second predetermined traveling velocity $V_2$ to time point $T_{03}$ at which traveling velocity V becomes first traveling velocity $V_1$, vehicle body deceleration increment correction quantity ΔGc is set to gradually be large at predetermined increment rate Ao together with an increase in a braking passage time (=timer counter CNT) or together with a decrease in traveling velocity V of the vehicle. In a, so-called, middle speed traveling state in which traveling velocity V is equal to or lower than second predetermined traveling velocity $V_2$ and equal to or higher than first predetermined traveling velocity $V_1$, the vehicle driver feels relieved since the deceleration is gradually increased. The vehicle driver can obtain the sense of security by setting vehicle body deceleration increment correction quantity ΔGc larger together with the increase of the braking passage time.

Then, after time point $T_{03}$ at which traveling velocity V of the vehicle becomes first predetermined traveling speed $V_1$, vehicle body deceleration increment correction quantity ΔGc is held at a value of time point $T_{03}$. In a, so-called low speed traveling state in which traveling velocity V is equal to or lower than first predetermined traveling velocity $V_1$, the vehicle driver generally carries out a fine adjustment of the braking force such that the vehicle stopped position is adjusted. Thus, vehicle body deceleration increment correction quantity ΔGc is maintained at a constant value or substantially constant value. Hence, the fine adjustment of the braking force becomes easy. In addition, since first predetermined traveling velocity $V_1$ is set to a velocity before the brake unit starts the self-oscillation, the self-oscillation can be suppressed.

In this way, according to the brake control system in the first embodiment, vehicle body increment correction quantity ΔGc during the start of braking is set to "0", vehicle body deceleration increment correction quantity ΔGc is set to be gradually larger along with the increase in the braking passage time or decrease in traveling velocity V of the vehicle in a region in which traveling velocity V of the vehicle is equal to or higher than first predetermined traveling velocity $V_1$, and in a region in which traveling velocity V of the vehicle is equal to or lower than first predetermined velocity $V_1$, vehicle body deceleration increment correction quantity ΔGc is set to be constant value or substantially constant value. Thus, the sense of security at the first half of braking and the suppression of the self-oscillation and easiness in the fine adjustment at the last half of braking is stably compatible.

As described above, pressure sensor 7 shown in FIG. 1 and step S1 in the calculation processing constitutes a braking operation state detecting section (means), step S2 in the calculating section constitutes a reference vehicle body deceleration setting section (means), and steps S6 through S10 of the calculation processing and steps S13 through S16 constitute a vehicle body deceleration increment correction quantity setting section (means), and steps S1 and S12 of the calculation processing shown in FIG. 2, braking fluid pressure control unit 10 shown in FIG. 1, and braking fluid pressure controller 13 constitutes a braking force controlling section (means).

Next, a second preferred embodiment of the brake control system according to the present invention will be described below. A rough configuration of the vehicle in this embodiment is generally the same as shown in FIG. 1. In this embodiment, the calculation processing carried out within braking fluid pressure controller 13 is changed from FIG. 2 in the case of the first embodiment to FIG. 4 in the case of this embodiment. Steps S21 through S25 are generally the same as steps S1 through S5, respectively. Hence, the detailed explanation of these steps S21 through S25 will herein be omitted. At a step S26, braking fluid pressure controller 13 determines whether brake lamp switch signal BRK is turned to ON. If brake lamp switch signal BRK is turned to ON, the routine goes to a step S27. If No at step S26, the routine goes to a step S31.

Figure 5:
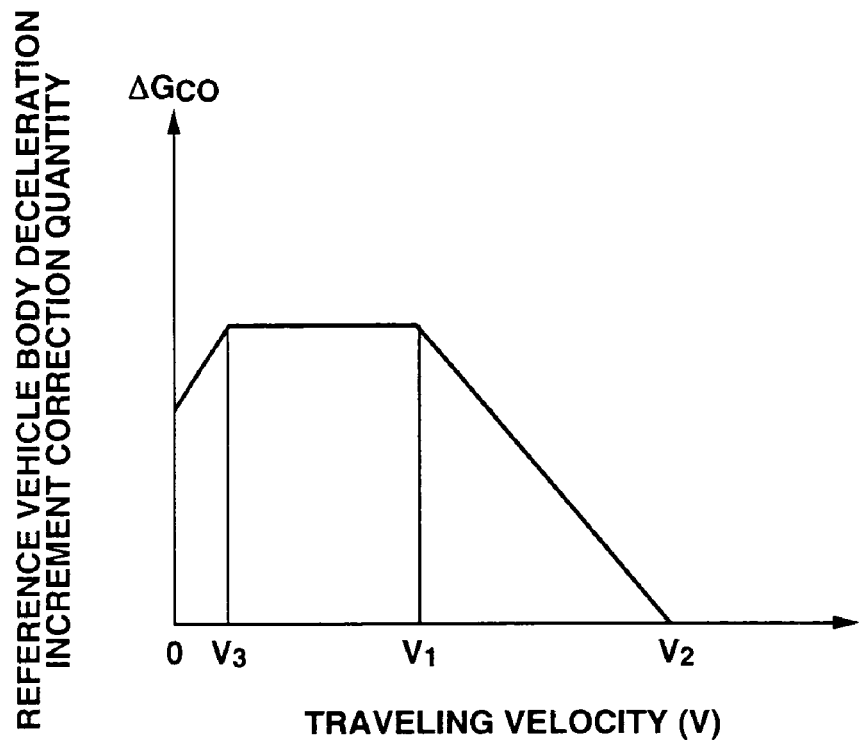
FIG. 5 is a control map used in the calculation processing shown in FIG. 4.

At step S27, braking fluid pressure controller 13 calculates, in accordance with a control map shown in FIG. 5, a reference vehicle body deceleration increment correction quantity $\Delta Gco$ according to traveling velocity V calculated at step S24 and the routine goes to a step S32. The control map shown in FIG. 5 is a conversion of vehicle body deceleration increment correction quantity $\Delta Gc$ described in the first embodiment into reference vehicle body deceleration increment correction quantity $\Delta Gco$ so as to enable the setting thereof in accordance with traveling velocity V of the vehicle. In a region in which traveling velocity V of the vehicle is equal to or higher than second predetermined traveling velocity $V_2$ set, for example, from approximately 50 Km/h (the upper limit value of the ordinary traveling velocity in the urban area) to approximately 70 Km/h (the upper limit value of the ordinary traveling velocity at the suburbs), reference vehicle body deceleration increment quantity $\Delta Gco$ is "0". In a region in which traveling velocity V of the vehicle is equal to or lower than second predetermined traveling velocity $V_2$ and is equal to or higher than first predetermined traveling velocity $V_1$ which is set to, for example, approximately 20 Km/h (the velocity at which the vehicle driver starts to adjust the stopped position of the vehicle or the velocity slightly higher than a velocity at which (immediately before) the brake unit starts the self-oscillation), reference vehicle body deceleration increment correction quantity $\Delta Gco$ is set to be gradually large at a constant gradient (may not be constant but may gradually and minutely increased or gradually and minutely decreased). In a region in which traveling velocity V is equal to or lower than first predetermined traveling velocity $V_1$ and equal to or higher than third predetermined traveling velocity $V_3$, reference vehicle deceleration increment correction quantity $\Delta Gco$ when traveling velocity V of the vehicle is first predetermined traveling velocity $V_1$ is held. It is noted that an increase rate of reference vehicle body deceleration increment correction quantity $\Delta Gco$ which is largely set along with the decrease in traveling velocity V of the vehicle in the region in which traveling velocity V of the vehicle is between second predetermined traveling velocity $V_2$ and first predetermined traveling velocity $V_1$ is a variation rate having the magnitude to a degree such that the driver feels that the deceleration is gradually increased, to a degree such that the vehicle driver hardly feels the increase of the deceleration, or to a degree such that the driver does not feel an increase of a pitching of a vehicle body. Specifically, the variation rate is set to 0.08 m/s$^2$/sec. during the braking of, for example, about 2 m/s$^2$.

Furthermore, in the second embodiment, third predetermined traveling speed $V_3$ is set in a traveling velocity region in which traveling velocity V of the vehicle is lower than first predetermined traveling speed $V_1$. Then, in a region of traveling velocity which is equal to or lower than third predetermined traveling velocity $V_3$, reference vehicle body deceleration increment correction quantity $\Delta Gco$ is set to be gradually small at a constant gradient (may not be constant but may gradually and minutely be increased or gradually and minutely be decreased) along with the decrease in traveling velocity V of the vehicle or the increase in the braking passage time. In order to avoid the pitching or the reactive shock at a time of a vehicular stop, this third predetermined traveling velocity $V_3$ is in a traveling velocity region in which the vehicle driver weakens the braking force at a time immediately before the vehicle stops. By making reference vehicle body deceleration increment correction quantity $\Delta Gco$ in this traveling velocity region small, that is to say, by making the braking force (an increment correction quantity of the braking force) small, in place of the vehicle driver, the pitching at the time of the vehicular stop or reactive shock is suppressed and prevented. This third predetermined traveling velocity $V_3$ may be a traveling velocity having a magnitude in which a resistance such as a running resistance which varies in accordance with, for example, the traveling velocity is hardly varied and is negligible or the traveling velocity at which a drive torque transmitted from the engine to front wheels 1FL, 1FR which are driving wheels via the automatic transmission is changed from a negative value (an engine brake torque) to a positive value (a creep torque). It is desirable that a decrease rate of reference vehicle body deceleration increment correction quantity $\Delta Gco$ in traveling velocity region equal to or lower than third predetermined traveling velocity $V_3$ has a degree such that the vehicle driver does not feel the variation in the deceleration. Hence, a maximum decrease width is desirably, for example, 0.02 G through 0.05 G.

Figure 4:
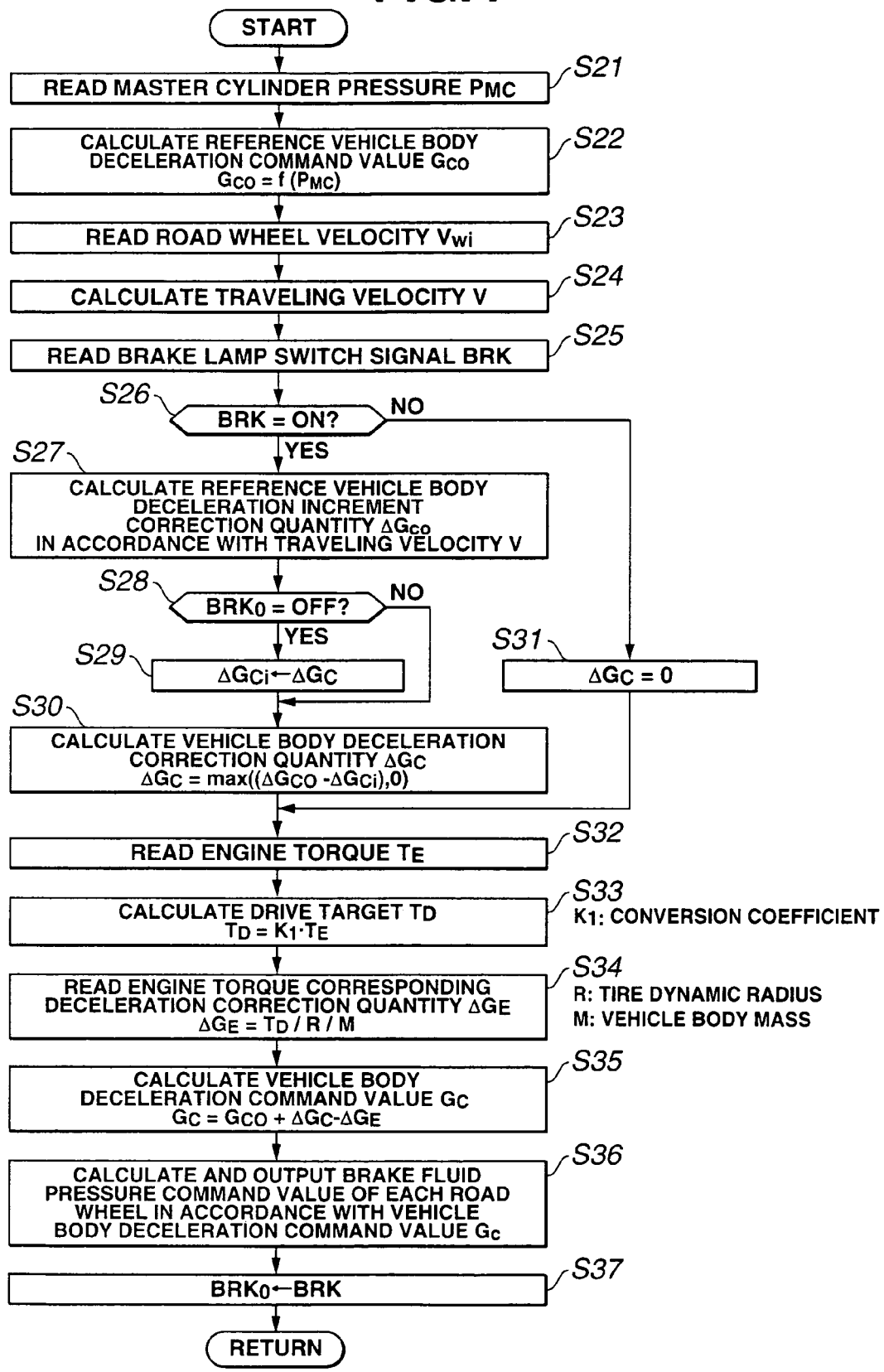
FIG. 4 is a flowchart representing the calculation processing of the calculation of the braking fluid pressure command value executed in the braking fluid pressure controller in a brake control system in a second preferred embodiment.

Referring back to step S28 in FIG. 4, braking fluid pressure controller 13 determines whether a previous value BRKo of brake lamp switch signal updated and stored into a memory unit has been in an OFF state. If previous value BRKo of brake lamp switch signal is in the OFF state (Yes), the routine goes to a step S29. If previous value BRKo is not in the OFF state (No), the routine goes to a step S30. At step S29, braking fluid pressure controller 13 updates and stores reference vehicle body deceleration increment correction quantity $\Delta Gco$ calculated at step S27 into the memory as a reference vehicle body deceleration increment correction initial value $\Delta Gc_i$ and the routine goes to step S30. That is to say, a value of reference vehicle body deceleration increment correction quantity $\Delta Gco$ when the brake lamp is turned from the off state to the on state is stored as an initial value.

At step S30, a subtraction value of reference vehicle body deceleration increment correction quantity initial value $\Delta Gc_i$ from reference vehicle body deceleration increment correction quantity $\Delta Gco$ is compared with "0" and braking fluid pressure controller 13 calculates one of the subtraction value and "0" which is larger than the other as vehicle body deceleration increment correction quantity $\Delta Gc$ and the routine goes to a step S32. That is to say, only a difference value from reference vehicle body deceleration increment correction quantity initial value $\Delta Gci$ is vehicle body deceleration increment correction quantity ΔGc to be added to reference vehicle body deceleration command value Gco in accordance with master cylinder pressure $P_{MC}$. During the braking start, this correction quantity ΔGc is "0".

On the other hand, at a step S31, braking fluid pressure controller 13 sets vehicle body deceleration increment correction quantity ΔGc to "0" and the routine goes to a step S32. At a step S32, braking fluid pressure controller 13 reads engine torque $T_E$ from the engine driving information obtained from engine controller 12. Next, the routine goes to a step S33 at which braking fluid pressure controller 13 calculates a drive torque $T_D$ by multiplying engine torque $T_E$ read at step S32 with a predetermined conversion coefficient $k_1$. It is noted that predetermined conversion coefficient $k_1$ is, for example, a product value between a shift ratio (speed reduction ratio) of the automatic transmission and a speed reduction ratio of a final differential gear.

Figure 6:
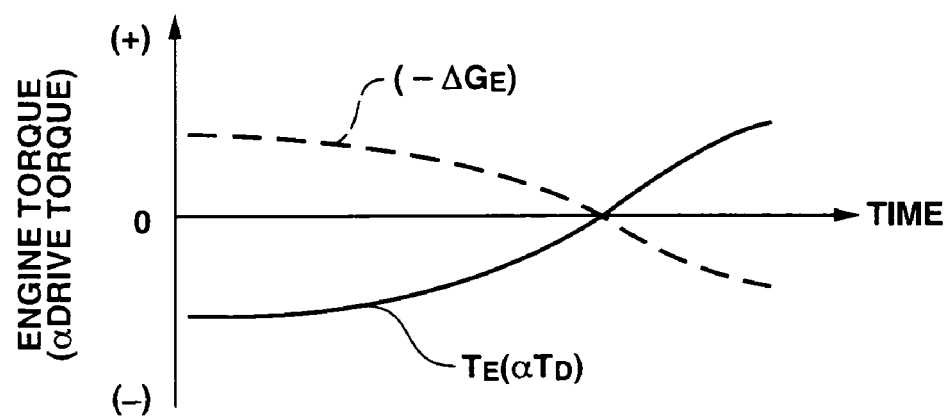
FIG. 6 is a control map used in the calculation processing shown in FIG. 4.

At the next step S34, braking fluid pressure controller 13 calculates an engine torque corresponding deceleration correction quantity $\Delta G_E$ by dividing drive torque $T_D$ calculated at step S33 with a tire dynamic radius R and a vehicle body mass M. This engine torque corresponding deceleration correction quantity $\Delta G_E$ is to remove engine torque $T_E$ of the negative value or positive value from vehicle body deceleration command value Gc or to load onto vehicle body deceleration command value Gc although, for example, as shown in FIG. 6, engine torque $T_E$ developed along with the decrease in the traveling velocity is varied from the engine brake torque (the negative value) to the creep torque (the positive value). Conceptually, a value in which a sign is inverted ($-\Delta G_E$) is as denoted by a dot line shown in FIG. 6.

Next, the routine goes to a step S35. At step S35, braking fluid pressure controller 13 calculates vehicle body deceleration command value Gc which is a subtraction of engine torque corresponding deceleration correction value $\Delta G_E$ calculated at step S34 from an addition value of reference vehicle body deceleration command value Gco calculated at step S22 and vehicle body deceleration increment correction quantity $\Delta G_E$ calculated at step S34. Then, the routine goes to the next step S36, braking fluid pressure controller 13 calculates a braking fluid pressure command value for each road wheel in accordance with vehicle body deceleration command value Gc calculated at step S35 and outputs it toward braking fluid pressure control unit 10. Then, the routine goes to the next step S37. At step S37, brake lamp switch signal BRK read at step S25 is updated as previous value BRKo of the brake lamp switch signal to a predetermined region of the storage unit (memory) and the routine is returned to a main program.

Hence, according to the braking control system for the automotive vehicle in the second preferred embodiment, in the same way as the first embodiment, the sense of security at the first half of braking and the fine adjustment at the latter half of braking are stably compatible. The deceleration due to the difference in traveling velocity V at the time of start of braking is not varied. Thus, the driver does not give the unpleasant feeling. In addition, in a region in which traveling velocity V of the vehicle is equal to or higher than second predetermined traveling velocity $V_2$, vehicle body deceleration increment correction quantity ΔGc is "0" so that the fine adjustment of traveling velocity V in a high-speed traveling state becomes easy. In a region in which traveling velocity V of the vehicle is equal to or higher than first predetermined traveling velocity $V_1$, vehicle body deceleration increment correction quantity ΔGc is gradually largely set along with the decrease in traveling velocity V of the vehicle. At this time, vehicle body deceleration increment correction quantity ΔGc is gradually largely set at a predetermined increment rate having a degree such that the vehicle driver feels that the deceleration is gradually increased, a degree such that the vehicle driver hardly feels that the deceleration is gradually increased, a degree such that the vehicle driver hardly feels the increase in the deceleration, or a degree such that the vehicle driver does not feel the increase in the vehicle body pitching quantity. Consequently, the vehicle driver does not give the unpleasant feeling.

In addition, in this embodiment, in a region in which traveling velocity V of the vehicle is equal to or lower than third predetermined traveling velocity $V_3$, reference vehicle body deceleration increment correction quantity ΔGco is set to be gradually small at the constant gradient along with the decrease in traveling velocity V of the vehicle. Thus, in place of the braking force control by the vehicle driver, it becomes possible to suppress and prevent the pitching or its reactive shock during the vehicular stop. Especially, when third predetermined traveling velocity $V_3$ is set to be the traveling velocity having the magnitude to a degree such that the resistance such as the traveling resistance varied in accordance with, for example, the traveling velocity is hardly varied and is negligible or the traveling velocity at which the drive torque transmitted from the engine to the driving wheels, viz., front road wheels 1FL, 1FR via the automatic transmission is changed from the negative value (engine brake torque) to the positive value (creep torque), the vehicle body pitching or its reactive shock during the vehicular stop can effectively be suppressed or prevented. In other words, since a deceleration element is small in the traveling region in which the running resistance is negligible and an acceleration element is present in the running velocity region in which the drive torque indicates the positive value, the braking force is made small in such velocity regions as described above. Thus, the vehicle body pitching or its reactive shock can effectively be suppressed or prevented.

In this embodiment, engine torque corresponding deceleration correction quantity $\Delta G_E$ in accordance with engine torque $T_E$ is calculated and set. The braking fluid pressure is controlled on the basis of the subtraction value of engine torque corresponding deceleration correction quantity $\Delta G_E$ from reference vehicle body deceleration increment correction quantity ΔGco. Thus, the fine adjustment of the braking force in accordance with the engine brake torque or the creep torque can be made in place of the vehicle driver. As described above, pressure sensor 7 shown in FIG. 1 and step S1 of the calculation processing shown in FIG. 4 constitute a braking operation state detecting section (means) according to the present invention. Step S2 of the calculation processing shown in FIG. 4 constitutes a reference vehicle body deceleration setting section (means). Steps S6 through S31 of the calculation processing shown in FIG. 4 constitutes a vehicle body deceleration increment correction quantity setting section (means). Step S35 in the calculation processing shown in FIG. 4, step S36, braking fluid pressure control unit 10, and braking fluid pressure controller 13 constitute a braking force controlling section (means). Step S32 of the calculation processing shown in FIG. 4 constitutes an engine torque detecting section (means). Steps S33 and S34 in the calculation processing shown in FIG. 4 constitute an engine torque corresponding deceleration correction quantity setting section (means).

It is noted that, in the second embodiment, the brake system in which the braking force of each road wheel can be adjusted separately and individually from the master cylinder pressure is an object. However, the brake control system according to the present invention is not limited to this. For example, the present invention is applicable to a, so-called, brake-by-wire in which the brake system for all parts or part of the road wheels is electrically connected to the master cylinder. The braking operation state by the vehicle driver may be detected according to, for example, a brake pedal stroke or a brake pedal depression force, in place of the master cylinder pressure. In these cases, it is possible to set the reference vehicle body deceleration command value in the same way in accordance with the brake pedal stroke or the brake pedal depression force. The number of the road wheels are not limited to four wheels but may be, for example, two wheels. In each of the first and second embodiments, braking fluid pressure controller is constituted by a microcomputer. However, the present invention is not limited to this. In place of the microcomputer, a calculation processing unit may appropriately be used.

The entire contents of a Japanese Patent Application No. 2004-114138 (filed in Japan on Apr. 8, 2004) are herein incorporated by reference. The scope of the invention is defined with reference to the following claims.

What is claimed is:

1. A brake control system for an automotive vehicle, comprising:
   a braking operation state detecting section configured to detect a braking operation state by a vehicle driver;
   a reference vehicle body deceleration setting section configured to set a reference vehicle body deceleration in accordance with the braking operation state detected by the braking operation state detecting section;
   a vehicle body deceleration increment correction quantity setting section configured to set a vehicle body deceleration increment correction quantity in accordance with at least one of a traveling velocity of the vehicle and an elapsed time of braking; and
   a braking force controlling section configured to control a braking force of each road wheel on a basis of an addition value of the reference vehicle body deceleration set by the reference vehicle body deceleration setting section and the vehicle body deceleration increment correction quantity set by the vehicle body deceleration increment correction quantity setting section,
   wherein the vehicle body deceleration increment correction quantity setting section is configured to set the vehicle body deceleration increment correction quantity to zero during a start of braking, to set the vehicle body deceleration increment correction quantity to be gradually larger along with at least one of a decrease in the traveling velocity of the vehicle and an increase in the elapsed time of braking in a first region in which the traveling velocity of the vehicle is equal to or higher than a first predetermined traveling velocity, to set the vehicle body deceleration increment correction quantity to a substantially constant value in a second region in which the traveling velocity of the vehicle is lower than the first predetermined traveling velocity, and to set the vehicle body deceleration increment correction quantity to zero in a third region in which the traveling velocity of the vehicle is higher than a second predetermined traveling velocity which is higher than the first predetermined traveling velocity.

2. A brake control system for an automotive vehicle as claimed in claim 1, wherein the vehicle body deceleration increment correction quantity setting section is configured to set the vehicle body deceleration increment correction quantity to be gradually larger along with at least one of the decrease in the traveling velocity and the increase in the elapsed time of braking in the first region in which the traveling velocity of the vehicle is equal to or higher than the first predetermined traveling velocity at a variation rate having a magnitude to a degree such that a vehicle driver feels that deceleration is gradually increased, to a degree such that the vehicle driver hardly feels the increase of the deceleration, or to a degree such that the vehicle driver does not feel an increase of a vehicle body pitching quantity.

3. A brake control system for an automotive vehicle as claimed in claim 1, wherein the vehicle body deceleration increment correction quantity setting section is configured to set the vehicle body deceleration increment correction quantity to be gradually smaller along with at least one of the decrease in the traveling velocity of the vehicle and the elapsed time of braking in a fourth region in which the traveling velocity of the vehicle is lower than a third predetermined traveling velocity which is lower than the first predetermined traveling velocity.

4. A brake control system for an automotive vehicle as claimed in claim 1, wherein the brake control system further comprises: an engine torque detecting section configured to detect an engine torque; and an engine torque corresponding deceleration correction quantity setting section configured to set a deceleration correction quantity in accordance with the engine torque detected by the engine torque detecting section, and
   wherein the braking force controlling section is configured to subtract the deceleration correction quantity set by the engine torque corresponding deceleration correction quantity setting section to control the braking force of each road wheel.

5. A brake control system for an automotive vehicle as claimed in claim 4, wherein the reference vehicle body deceleration setting section is configured to set the reference vehicle body deceleration on a basis of a master cylinder pressure.

6. A brake control system for an automotive vehicle as claimed in claim 5, wherein the brake control system further comprises: a first determining section configured to determine whether the traveling velocity of the vehicle is equal to or lower than the second predetermined traveling velocity; and a second determining section configured to determine whether the traveling velocity of the vehicle is equal to or higher than the first predetermined traveling velocity which is lower than the second predetermined traveling velocity, and
   wherein the vehicle body deceleration increment correction quantity setting section is configured to set the vehicle body deceleration increment correction quantity to zero when the first determining section determines that the traveling velocity of the vehicle is higher than the second predetermined traveling velocity, to set the vehicle body deceleration increment correction quantity to the substantially constant value when the first determining section determines that the traveling velocity of the vehicle is lower than the first predetermined traveling velocity, and to set the vehicle body deceleration increment correction quantity to be gradually larger along with braking passage time when the second determining section determines that the traveling velocity of the vehicle is equal to or higher than the first predetermined traveling velocity and is equal to or lower than the second predetermined traveling velocity.

7. A brake control system for an automotive vehicle as claimed in claim 6, wherein the vehicle body deceleration increment correction quantity setting section is configured to set the vehicle body deceleration increment correction quantity ($\Delta Gc$) to be gradually larger as $\Delta Gc = Ao \cdot CNT$, wherein Ao denotes a predetermined increase rate and CNT denotes a timer count value when the traveling velocity of the vehicle is equal to or higher than the first predetermined traveling velocity and equal to or lower than the second predetermined traveling velocity.

8. A brake control system for an automotive vehicle as claimed in claim 7, wherein the predetermined increase rate (Ao) is 0.08 m/s$^2$/sec during braking of 2 m/s$^2$ and the timer count value is incremented by one whenever the traveling velocity of the vehicle is equal to or higher than the first predetermined traveling velocity and equal to or lower than the second predetermined traveling velocity.

9. A brake control system for an automotive vehicle as claimed in claim 7, wherein the first predetermined traveling velocity is a velocity at which a vehicle driver starts to adjust a vehicular stopped position or a velocity immediately before a start of a self-oscillation of a brake unit.

10. A brake control system for an automotive vehicle as claimed in claim 9, wherein the first predetermined traveling velocity is about 20 Km/h.

11. A brake control system for an automotive vehicle as claimed in claim 7, wherein the second predetermined traveling velocity is a velocity set from an upper limit value of an ordinary traveling velocity at an urban area to an upper limit value of an ordinary traveling velocity at a suburban area.

12. A brake control system for an automotive vehicle as claimed in claim 11, wherein the second predetermined traveling velocity is a velocity set from about 50 Km/h to about 70 Km/h.

13. A brake control system for an automotive vehicle as claimed in claim 6, wherein the vehicle body deceleration increment correction quantity setting section comprises a reference vehicle body deceleration increment correction quantity calculating section configured to calculate a reference vehicle body deceleration increment correction quantity which corresponds to the vehicle body deceleration increment correction quantity in accordance with the traveling velocity of the vehicle.

14. A brake system for an automotive vehicle as claimed in claim 13, wherein the brake control system further comprises a third determining section configured to determine whether the traveling velocity of the vehicle is equal to or lower than a third predetermined traveling velocity which is lower than the first predetermined traveling velocity, and
wherein a reference vehicle body deceleration increment correction quantity setting section is configured to set the reference vehicle body deceleration increment correction quantity to be gradually smaller at a substantially constant gradient along with the decrease in the traveling velocity of the vehicle or the increase in the elapsed time of braking when the third determining section determines that the traveling velocity of the vehicle is equal to or lower than the third predetermined traveling velocity.

15. A brake control system for an automotive vehicle as claimed in claim 14, wherein the third predetermined traveling velocity is the traveling velocity having a magnitude to a degree such that a resistance is hardly varied and is negligible or the traveling velocity at which a driver torque transmitted from an engine to driving wheels is changed from a negative value to a positive value.

16. A brake control system for an automotive vehicle as claimed in claim 14, wherein the vehicle body deceleration increment correction quantity setting section sets the vehicle body deceleration increment correction quantity to one of a subtraction value of a reference vehicle body deceleration increment correction quantity initial value from the calculated reference vehicle body deceleration increment correction quantity and 0, whichever is larger, and the brake control system further comprises an engine torque corresponding deceleration correction quantity calculating section configured to calculate an engine torque corresponding deceleration correction quantity on a basis of an engine torque.

17. A brake control system for an automotive vehicle as claimed in claim 16, wherein the braking force controlling section is configured to calculate a vehicle body deceleration command value from a subtraction value of the engine torque corresponding deceleration correction quantity from an addition value of a reference vehicle body deceleration command value and the vehicle body deceleration increment correction quantity.

18. A brake control system for an automotive vehicle, comprising:
braking operation state detecting means for detecting a braking operation state by a vehicle driver;
reference vehicle body deceleration setting means for setting a reference vehicle body deceleration in accordance with the braking operation state detected by the braking operation state detecting means;
vehicle body deceleration increment correction quantity setting means for setting a vehicle body deceleration increment correction quantity in accordance with at least one of a traveling velocity of the vehicle and a braking passage time; and
braking force controlling means for controlling a braking force of each road wheel on a basis of an addition value of the reference vehicle body deceleration set by the reference vehicle body deceleration setting means and the vehicle body deceleration increment correction quantity set by the vehicle body deceleration increment correction quantity setting means,
wherein the vehicle body deceleration increment correction quantity setting means sets the vehicle body deceleration increment correction quantity to zero during a start of braking, sets the vehicle body deceleration increment correction quantity to be gradually larger along with at least one of a decrease in the traveling velocity of the vehicle and an increase in an elapsed time of braking in a first region in which the traveling velocity of the vehicle is equal to or higher than a first predetermined traveling velocity, sets the vehicle body deceleration increment correction quantity to a substantially constant value in a second region in which the traveling velocity of the vehicle is lower than the first predetermined traveling velocity, and sets the vehicle body deceleration increment correction quantity to zero in a third region in which the traveling velocity of the vehicle is higher than a second predetermined traveling velocity which is higher than the first predetermined traveling velocity.

19. A brake control method for an automotive vehicle, comprising:
detecting a braking operation state by a vehicle driver;
setting a reference vehicle body deceleration in accordance with the braking operation state detected at the braking operation state detecting;
setting a vehicle body deceleration increment correction quantity in accordance with at least one of a traveling velocity of the vehicle and an elapsed time of braking; and
controlling a braking force of each road wheel on a basis of an addition value of the reference vehicle body deceleration set at the reference vehicle body deceleration setting and the vehicle body deceleration increment correction quantity set at the vehicle body deceleration increment correction quantity setting, wherein the vehicle body deceleration increment correction quantity setting comprises: setting the vehicle body deceleration increment correction quantity to zero during a start of braking, setting the vehicle body deceleration increment correction quantity to be gradually larger along with at least one of a decrease in the traveling velocity of the vehicle and an increase in the elapsed time of braking in a first region in which the traveling velocity of the vehicle is equal to or higher than a first predetermined traveling velocity, setting the vehicle body deceleration increment correction quantity to a substantially constant value in a second region in which the traveling velocity of the vehicle is lower than the first predetermined traveling velocity, and setting the vehicle body deceleration increment correction quantity to zero in a third region in which the traveling velocity of the vehicle is higher than a second predetermined traveling velocity which is higher than the first predetermined traveling velocity.

\* \* \* \* \*